(12) United States Patent
Ovalles et al.

(10) Patent No.: US 10,975,291 B2
(45) Date of Patent: Apr. 13, 2021

(54) METHOD OF SELECTION OF ASPHALTENE PRECIPITANT ADDITIVES AND PROCESS FOR SUBSURFACE UPGRADING THEREWITH

(71) Applicant: Chevron U.S.A. Inc., San Ramon, CA (US)

(72) Inventors: Cesar Ovalles, Walnut Creek, CA (US); Estrella Rogel, Orinda, CA (US); Ian Phillip Benson, The Woodlands, TX (US); Ronald A. Behrens, Bakersfield, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 129 days.

(21) Appl. No.: 15/890,459

(22) Filed: Feb. 7, 2018

(65) Prior Publication Data

US 2019/0241795 A1    Aug. 8, 2019

(51) Int. Cl.
*C09K 8/594*    (2006.01)
*E21B 43/26*    (2006.01)
(Continued)

(52) U.S. Cl.
CPC .............. *C09K 8/594* (2013.01); *C09K 8/62* (2013.01); *E21B 43/24* (2013.01); *E21B 43/26* (2013.01); *E21B 43/38* (2013.01)

(58) Field of Classification Search
CPC ......... C09K 8/594; E21B 43/24; E21B 43/26; E21B 43/38
See application file for complete search history.

(56) References Cited

U.S. PATENT DOCUMENTS 2,412,765 A    12/1946 Buddrus et al.
3,351,132 A    11/1967 Dougan et al.
(Continued)

FOREIGN PATENT DOCUMENTS

CA    2779238    12/2013

OTHER PUBLICATIONS

Ardali, M, et al.; "A Critical Review of Hybrid Steam-Solvent Processes to Recover Heavy Oil"; SPE 159257, (2012), pp. 1-12.
(Continued)

*Primary Examiner* — Crystal J Miller

(57) ABSTRACT

In-situ upgrading of heavy hydrocarbons includes injecting into a reservoir solvent, an asphaltene precipitant additive and optionally steam, at a ratio of solvent to heavy hydrocarbon between 0.1:1 and 20:1 under reservoir conditions. The additive has C—H, C—C and/or C—O bonds that thermally crack to generate free radicals in the vapor phase after injection. Formed downhole are a blend containing an upgraded hydrocarbon, and precipitated asphaltenes. The upgraded hydrocarbon is produced such that the precipitated asphaltenes remain in the reservoir. The upgraded hydrocarbon has a greater API gravity, lower asphaltene content, and lower viscosity than the heavy hydrocarbon. The precipitated asphaltenes are present in a higher amount than a similar blend not containing the additive. A method for selecting the additive includes identifying candidate additives having bonds that crack to generate free radicals in the vapor phase at the operating temperature, and calculating percent increase of asphaltenes precipitated for each.

21 Claims, 6 Drawing Sheets

(51) Int. Cl.
*E21B 43/24* (2006.01)
*E21B 43/38* (2006.01)
*C09K 8/62* (2006.01)

(56) References Cited

U.S. PATENT DOCUMENTS

| | | | |
|---|---|---|---|
| 3,386,513 | A | 6/1968 | Holmes et al. |
| 3,945,435 | A | 3/1976 | Barry |
| 3,954,141 | A | 5/1976 | Allen et al. |
| 4,007,785 | A | 2/1977 | Allen et al. |
| 4,008,764 | A | 2/1977 | Allen |
| 4,223,728 | A | 9/1980 | Pegg |
| 4,280,559 | A | 7/1981 | Best |
| 4,344,485 | A | 8/1982 | Butler |
| 4,362,212 | A | 12/1982 | Schulz |
| 4,362,213 | A | 12/1982 | Tabor |
| 4,372,383 | A | 2/1983 | Ames |
| 4,418,752 | A | 12/1983 | Boyer et al. |
| 4,450,913 | A | 5/1984 | Allen et al. |
| 4,513,819 | A | 4/1985 | Islip et al. |
| 4,531,586 | A | 7/1985 | McMillen |
| 4,560,003 | A | 12/1985 | McMillen et al. |
| 4,643,252 | A | 2/1987 | Kovarik |
| 4,753,293 | A | 6/1988 | Bohn, Jr. |
| 5,018,576 | A | 5/1991 | Udell et al. |
| 5,131,471 | A | 7/1992 | Duerksen et al. |
| 5,214,224 | A | 5/1993 | Comer et al. |
| 5,388,644 | A | 2/1995 | Romocki |
| 5,407,009 | A | 4/1995 | Butler et al. |
| 5,425,422 | A | 6/1995 | Jamaluddin et al. |
| 5,607,016 | A | 3/1997 | Butler |
| 5,771,973 | A | 6/1998 | Jensen et al. |
| 5,891,829 | A | 4/1999 | Vallejos et al. |
| 5,899,274 | A | 5/1999 | Frauenfeld et al. |
| 6,230,814 | B1 | 5/2001 | Nasr et al. |
| 6,318,464 | B1 | 11/2001 | Mokrys |
| 6,405,799 | B1 | 6/2002 | Vallejos et al. |
| 6,511,601 | B2 | 1/2003 | McMurtrey et al. |
| 6,662,872 | B2 | 12/2003 | Gutek et al. |
| 6,883,607 | B2 | 4/2005 | Nenniger et al. |
| 8,846,582 | B2 | 9/2014 | Hughes et al. |
| 9,670,760 | B2 | 6/2017 | Ovalles et al. |
| 2007/0062698 | A1 | 3/2007 | Smith et al. |
| 2012/0090220 | A1 | 4/2012 | Dieckmann et al. |
| 2013/0334097 | A1 | 12/2013 | Patino et al. |
| 2013/0334100 | A1* | 12/2013 | Mazyar ............ C09K 8/035 208/106 |
| 2014/0130581 | A1* | 5/2014 | Ovalles ............ C09K 8/04 73/61.55 |
| 2015/0114635 | A1* | 4/2015 | Ovalles ............ C09K 8/594 166/263 |
| 2016/0177691 | A1* | 6/2016 | Benson ............ E21B 43/2406 166/272.3 |
| 2017/0210972 | A1 | 7/2017 | Williamson et al. |

OTHER PUBLICATIONS

Bayless, Jack H., et al.; "Oil Well Stimulation with Hydrogen Peroxide"; SPE 38348, (1997), pp. 117-118.
Das, S.K.; "Vapex: An Efficient Process for the Recovery of Heavy Oil and Bitumen"; SPE Journal, (1998), pp. 232-237.
Das, S.; "Diffusion and Dispersion in the Simulation of Vapex Process"; SPE/PS-CIM/CHOA, SPE 97924, PS2005-418, Canadian Heavy Oil Association, (2005), pp. 1-6.
Guo, Kun, et al.; "In-Situ Heavy and Extra Heavy Oil Recover: A Review"; (2016), Fuel, vol. 185, pp. 886-902.
Gupta, S.S., et al.; "Christina Lake Solvent Aided Process Pilot"; Petroleum Society, Canadian Institute of Mining Metallurgy & Petroleum, Paper 2005-190, Petroleum Society's Canadian International Petroleum Conference, 56$^{th}$ Annual Technical Meeting, (2005), pp. 1-11.
Jha, Raman, et al.; "New Insights into Steam-Solvent Co-Injection Process Mechanism"; SPE 159277, (2012), pp. 1-14.
Jing, Guolin, et al.; "Wet Peroxide Oxidation of Oilfield Sludge"; (2015), Arabian Journal of Chemistry, vol. 8, pp. 208-211.
Lin, Lixing, et al.; "A Critical Review of the Solvent-Based Heavy Oil Recovery Methods"; SPE-170098-MS, (2014), pp. 1-20.
Mokrys, I.J., et al.; "In-Situ Upgrading of Heavy Oils and Bitumen by Propane Deasphalting: The Vapex Process"; SPE 25452, (1993), pp. 409-424.
Ovalles, Cesar, et al.; "Physical and Numerical Simulations of Subsurface Upgrading by Use of Solvent Deasphalting in a Heavy-Crude-Oil Reservoir"; SPE 183636-PA, SPE Reservoir Evaluation & Engineering, (2017), pp. 654-668.
Rogel, Estrella, et al.; "Determination of Asphaltenes in Crude Oil and Petroleum Products by the on Column Precipitation Method"; Energy Fuels, (2009), vol. 23, pp. 4515-4521.
Rogel, Estrella, et al.; "Subsurface Upgrading of Heavy Oils via Solvent Deasphalting Using Asphaltene Precipitants. Preparative Separations and Mechanism of Asphaltene Precipitation Using Benzoyl Peroxide as Precipitant"; Energy & Fuels, (2017), vol. 31, pp. 9213-9222.
Sadeghi, Kazem M., et al.; "Novel Extraction of Tar Sands by Sonication with the Aid of In Situ Surfactants"; (1990), Energy & Fuels, vol. 4, pp. 604-608.
International Search Report, dated Feb. 4, 2015, during the prosecution of International Application No. PCT/US2014/061922.
Written Opinion of the International Searching Authority, dated Feb. 4, 2015, during the prosecution of International Application No. PCT/US2014/061922.

* cited by examiner

METHOD OF SELECTION OF ASPHALTENE PRECIPITANT ADDITIVES AND PROCESS FOR SUBSURFACE UPGRADING THEREWITH

FIELD

The present invention generally relates to a process for in situ upgrading of a heavy hydrocarbon in the presence of one or more asphaltene precipitant additives.

BACKGROUND

Subsurface upgrading of heavy oil (HO) has been of interest to the petroleum industry because of the intrinsic advantages compared with aboveground counterparts. The main advantages are lower lifting and transportation costs from the underground to the refining centers with the potential increase of the volumetric production rate of wells and in the value of the upgraded oil, decrease in consumption of costly light and medium petroleum oils used as solvents for HO production, move estimated and probable HO reserves to proved reserves, possibility of reducing capital and operating expenses of upgrader units by performing the upgrading subsurface and use of porous media (a mineral formation) as a natural chemical "catalytic reactor" to further improve the properties of upgraded crude oil. However, there are significant challenges that must be addressed to accomplish a successful downhole upgrading process.

Several methods have been proposed for producing such heavy hydrocarbons. These methods include the use of multiple wells including parallel horizontal wells drilled into water formations beneath the heavy hydrocarbon, and injection of various additives through the horizontal wells to assist in production from a separate well drilled into the producing formation. Unfortunately, this method requires the actual drilling of a potentially large number of wells for production from a single well, with the attendant increase in cost of labor and equipment, and results in large amounts of potentially expensive additives being injected through the horizontal wells.

"Huff and puff" or cyclic pressurizing and production techniques are also known wherein a well is pressurized for a period, and then allowed to produce. This method can provide some enhanced production for certain wells. However, with particularly heavy hydrocarbons, this technique leaves much room for improvement.

In SPE paper No. 25452, a process for the in-situ upgrading of heavy oils and bitumen by propane deasphalting is proposed. This process utilizes two parallel horizontal wells, as reported in the Steam Assisted Gravity Drainage process (SAGD), but with the steam chamber being replaced by a chamber containing hydrocarbon vapor near its dew point. In this process, cold propane is continuously injected for the top horizontal well and the upgraded heavy oil/solvent blend is produced from the bottom well. The heavy oil is upgraded in terms of permanent viscosity reduction via solvent deasphalting.

Gupta and Gittins (Conference paper No. 2005-190 presented at Canadian International Petroleum Conference, Jun. 7-9, 2005, Calgary, Alberta) reported the field testing of a solvent aided process which involves the co-injection of a hydrocarbon solvent and steam during SAGD operation. The authors observed increases up to one degree of the API gravity of the produced oil.

In U.S. Pat. No. 6,883,607, a process for the recovery of hydrocarbons is disclosed which involves the use of warm solvents to extract heavy oil from oil bearing formation. The solvent is continuously injected downhole and placed into the formation at a temperature and pressure sufficient for the solvent to be in the vapor state and to condense on the extraction surface. Then, a solvent-heavy oil blend is produced and, after solvent separation and purification, it is re-injected into the formation again. The patent further discloses that the presence of the solvent in the heavy oil leads to precipitation of asphaltenes which upgrades the heavy oil via improvements in the API and reduction of metals and sulfur contents and Conradson carbon.

Another example is U.S. Pat. No. 6,405,799 which discloses a process for in situ upgrading of a heavy hydrocarbon. The process includes the steps of (a) positioning a well in a reservoir containing a heavy hydrocarbon having an initial API gravity of less than or equal to about 8; (b) injecting a light solvent into the well at reservoir conditions to provide an upgraded hydrocarbon in the reservoir, the upgraded hydrocarbon having an improved API gravity greater than the initial API gravity; and (c) producing the upgraded hydrocarbon from the well.

In the above mentioned prior art, the use of large amounts of solvent is required to precipitate asphaltenes downhole to upgrade of the heavy oil, as measured by, for example, API gravity increase and permanent viscosity reduction. Independent of the type of process, for example, huff and puff (discontinuous) or continuous solvent injection such as used in a variation of SAGD, the solvent to produced-heavy oil ratios used in the field are in the range of from about 0.5 to about 10 volume per volume (v/v). These high solvent-to-heavy-oil ratios not only increase the operating expenses of the process due to the need of high solvent inventories but also increase the capital costs due to larger size surface facilities for solvent separation, purification and recycling. Additionally, due to loss of injected solvent to thief zones present in the reservoir, there is a need for solvent make-up that further increases the operating costs of the downhole upgrading processes.

As an alternative to the above techniques, to reduce the solvent-to-oil ratio (SvOR) and to generate cost savings, U.S. Pat. No. 9,670,760 discloses the use of benzoyl peroxide (BP), 4-vinyl pyridine methacrylate, 4-vinyl phenol methacrylate, poly(maleic anhydride), iron and nickel nanoparticles as asphaltene precipitants for heavy crude oils. Initial experiments showed that BP provided an increase of ~21 wt. % in the asphaltene content for a 2500 ppm dosage and 50° C. These results indicated that, at the same SvOR, adding in small amounts (ppm) of an asphaltene precipitant can increase the API gravity of the produced oil by 5.4° API and increase the amount of asphaltenes precipitated by almost 5 wt. %. These results indicated that it is possible to save between 30 to 50 vol. % of the solvent by using asphaltene precipitant additives. However, all the asphaltene precipitants tested are solids at room and reservoir temperatures. Their use in the presence of the porous media is limited to near the wellbore either in the presence of steam or warm solvents. Therefore, unfortunately, little to no penetration into the formation and further away from the injection wellbore is expected.

It would be desirable to provide improved processes for in situ upgrading of heavy crude oils that can be carried out with low operating and capital expenses in a simple and cost-efficient manner and at the same time extend into the formation a significant distance.

SUMMARY

In general, in one aspect, the disclosure relates to a process for in situ upgrading of a heavy hydrocarbon in a reservoir having an injection well and a production well, or a well that is alternately operated as an injection well and a production well. The process includes injecting into the injection well in the reservoir one or more hydrocarbon solvents and one or more asphaltene precipitant additives comprising compounds having C—H, C—C and/or C—O bonds that thermally crack to generate free radicals that are predominantly in the vapor phase after injection into the reservoir in any order at a ratio by volume of the solvent to the heavy hydrocarbon of from 0.1:1 to about 20:1 under reservoir conditions so as to provide a blend containing an upgraded hydrocarbon, the one or more hydrocarbon solvents and a remaining portion of the one or more asphaltene precipitant additives, and precipitated asphaltenes, in the reservoir. The upgraded hydrocarbon is produced from the production well without the precipitated asphaltenes such that the precipitated asphaltenes remain in the reservoir. The one or more asphaltene precipitant additives include compounds having C—H, C—C and/or C—O bonds that thermally crack to generate free radicals that are predominantly in the vapor phase after injection into the reservoir at an injection site. The upgraded hydrocarbon, after separation from the hydrocarbon solvents and any significant amount of asphaltene precipitant additives, has an API gravity greater than an initial API gravity of the heavy hydrocarbon, an asphaltene content lower than an initial asphaltene content of the heavy hydrocarbon, and a viscosity lower than an initial viscosity of the heavy hydrocarbon. The precipitated asphaltenes are present in a higher amount than prior to the injection of the one or more asphaltene precipitant additives.

In another aspect, the disclosure can generally relate to a method for selecting an asphaltene precipitant additive for use in a process for in situ upgrading of a heavy hydrocarbon in a reservoir having an injection well and a production well, or a well that is alternately operated as an injection well and a production well. The method includes first determining reservoir conditions for the reservoir including an initial reservoir temperature, a reservoir pressure and an operating temperature. Next, a plurality of candidate additives is identified for use as the asphaltene precipitant additive. The plurality of candidate additives is a plurality of compounds having C—H, C—C or C—O bonds that thermally crack at the operating temperature to generate free radicals that are predominantly in the vapor phase at the operating temperature. A weight percent asphaltenes precipitated from the heavy hydrocarbon and a hydrocarbon solvent solution with no asphaltene precipitant additive is determined. A weight percent asphaltenes precipitated from the heavy hydrocarbon and the hydrocarbon solvent solution with each of the plurality of candidate additives as identified is determined. A percent increase of asphaltenes precipitated for each of the plurality of candidate additives is calculated using the following equation:

Percent (%) increase of asphaltenes precipitated=
[(weight % asphaltenes precipitated with candidate additive−weight % asphaltenes precipitated with no additive)/weight % asphaltenes precipitated with no additive]×100.

Finally, the candidate additive giving the highest calculated percent increase of asphaltenes precipitated among the plurality of candidate additives is selected for use as the asphaltene precipitant additive.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
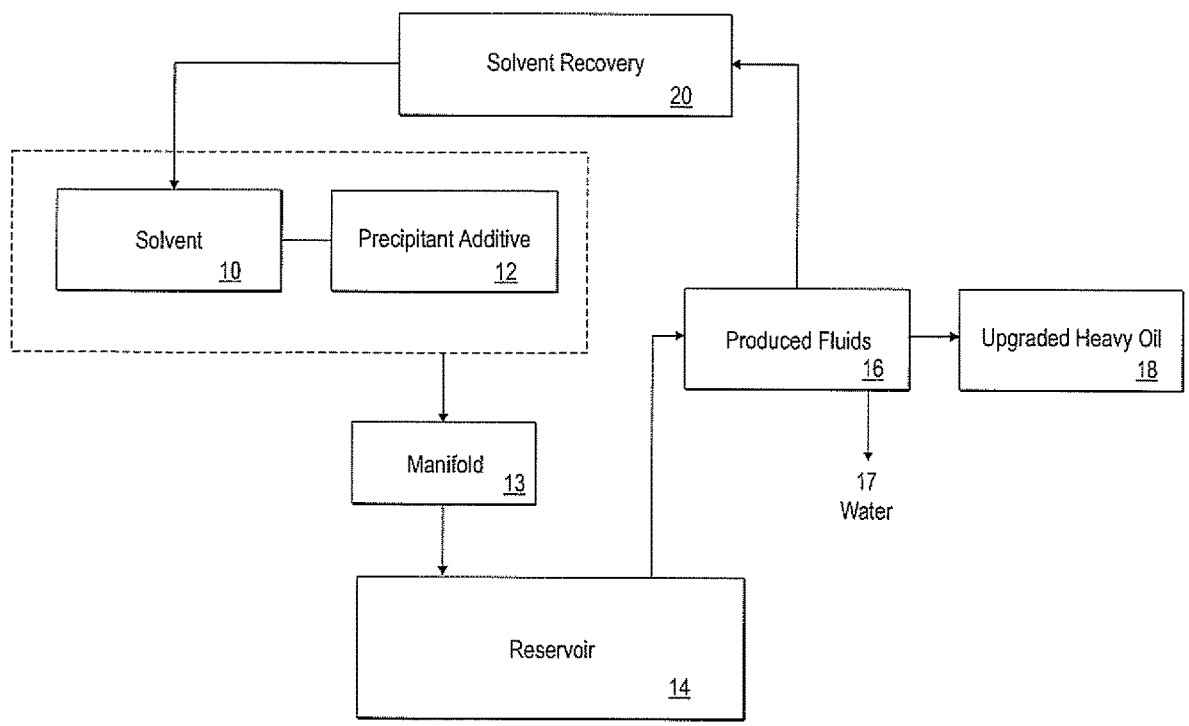
FIG. 1 is a schematic diagram for the process for in situ upgrading of a heavy hydrocarbon via solvent deasphalting using asphaltene precipitant additives that travel in the gas phase.

Embodiments of the present invention are directed to a process for in situ upgrading of a heavy hydrocarbon including injecting one or more hydrocarbon solvents and one or more asphaltene precipitant additives into a well in a reservoir in any order under reservoir conditions to provide an upgraded hydrocarbon in the reservoir. The upgraded hydrocarbon having an improved API gravity greater than the initial API gravity, a reduction in the asphaltene content, and a lower viscosity is then produced from the well. The reservoir can contain a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt). In general, the heavy hydrocarbon is an asphaltene-containing liquid crude hydrocarbon. Asphaltenes are a mixed solubility class of compounds as opposed to a chemical class of compounds, are generally solid or semi-solid in nature and include polynuclear aromatics present in the solution of smaller aromatics and resin molecules, and are present in crude oils and heavy fractions in varying quantities. Asphaltenes do not usually exist in all condensates or light crude oils; however, they are present in relatively large quantities in heavy crude oils and petroleum fractions. Asphaltenes are insoluble components or fractions and their concentrations are defined as the amount of asphaltenes precipitated by addition of an n-paraffin solvent to the feedstock which are completely soluble in aromatic solvents, as prescribed in the Institute of Petroleum Method IP-143. The heavy hydrocarbon can contain a heavy crude oil, an extra heavy crude oil and/or bitumen.

In one embodiment, the heavy hydrocarbon has an initial API gravity of from about 5 to about 20, an n-heptane asphaltene content as measured by the ASTM D-6560 of at least about 1 wt. % and up to about 15 wt. %, and a viscosity at 35° C. greater than about 350 cSt and up to about 100,000 cSt. In one embodiment, the heavy hydrocarbon has an initial API gravity of from about 8 to about 20, an n-heptane asphaltene content as measured by the ASTM D-6560 of at least about 1 wt. % and up to about 10 wt. %, and a viscosity at 35° C. greater than about 350 cSt and up to about 70,000 viscosity measurements are determined herein according to ASTM D445.

As disclosed in U.S. Pat. No. 9,670,760, the contents of which are herein incorporated by reference, a process for in situ upgrading of a heavy hydrocarbon in the presence of one or more asphaltene precipitant additives is known. However, all the asphaltene precipitants disclosed therein are solid at room and reservoir temperatures and thus, no penetration into the formation and away from the wellbore is expected to occur in use. While penetration could be increased slightly by increasing the injection rate or dilating the reservoir, there is still a need for much greater penetration into the reservoir. Described herein in embodiments, asphaltene precipitant additives have been identified that surprisingly enable far greater penetration into the formation and away from the wellbore when injected with hydrocarbon solvents into the reservoir. This greatly improves the economics of the in situ upgrading process.

The injection can be either into the injection well of a reservoir having an injection well and a production well, or into a well that is alternately operated as an injection well and a production well. In one embodiment, the process for in situ upgrading of a heavy hydrocarbon involves a cyclical process, also referred to as cyclic steam injection, cyclic steam injection or "huff and puff," with a single well acting as both injection well and production well. It should be understood that "injection well" refers to both wells that are exclusively used for injection and wells that alternate between injection and production. It should be understood that the number of injection wells can vary.

It has been found that suitable asphaltene precipitant additives are compounds having C—H, C—C and/or C—O bonds that thermally crack to generate free radicals that are predominantly in the vapor phase after injection into the reservoir under reservoir conditions. By "free radical" is meant a very reactive chemical species having a single unpaired electron and a singly occupied orbital. Free radicals can be stabilized through donation of electrons from nearby compounds. Free radical stability increases in the following order: methyl<primary<secondary<tertiary<benzyl. By "predominantly in the vapor phase" is meant that more than 50 wt. %, even more than 75 wt. %, even more than 90 wt. %, of the free radicals is in the vapor phase.

Reservoir conditions can include, by way of example, an initial temperature prior to any heated, e.g., steam, injection of between about 5° C. and about 140° C., even between about 40° C. and about 140° C., and a pressure of between about 250 psia and about 2500 psia. The temperature is one at which the asphaltene precipitant cracks and forms a free radical. The hydrocarbon solvents and asphaltene precipitant additives can be injected into the injection well at temperatures greater than the initial reservoir temperature.

In one embodiment, the one or more asphaltene precipitant additives is a compound selected from ethers, alcohols and hydrocarbons, and combinations thereof. In one embodiment, the one or more asphaltene precipitant additives further includes a water-soluble compound, e.g., hydrogen peroxide, mixed with the ether, alcohol and/or hydrocarbons.

Suitable ethers are selected from symmetrical ethers, asymmetrical ethers, and combinations thereof. More particularly, the ethers can be selected from dimethylether, diethylether, di-n-propylether, diisopropylether, dibutylether, di-n-butylether, diisobutylether, di-tert-butylether, methylethylether, methylpropylether, methylbutylether, methyl-tert-butylether, ethylpropylether, ethylbutylether, propylbutylether, and combinations thereof.

Suitable alcohols are selected from n-propanol, isopropanol, 2-phenyl-2-propanol, allyl alcohol, butanol, isobutanol, tert-butanol, benzyl alcohol, and combinations thereof.

Suitable hydrocarbons are selected from bibenzyl, naphthalene, methyl naphthalene, ethyl naphthalene, propyl naphthalene, tetralin, 1,2-dihydronaphthalene, 1,4-dihydronaphthalene, cumene, and combinations thereof.

In one embodiment, the one or more asphaltene precipitant additives comprises a compound selected from diethylether, diisopropylether, isopropanol, allyl alcohol, bibenzyl, methyl naphthalene, tetralin, and combinations thereof.

In one embodiment, the one or more asphaltene precipitant additives includes a mixture selected from mixtures of hydrogen peroxide and a co-solvent e.g. acetone, mixtures of hydrogen peroxide and isopropanol, mixtures of hydrogen peroxide and methyl-tert-butylether, mixtures of hydrogen peroxide and tert-butanol, and combinations thereof.

In one embodiment, the asphaltene precipitant additives travel from the injection site in the reservoir in the vapor phase after injection is at least 10 meters, even at least 30 meters, and even at least 70 meters, thus penetrating farther into the formation than previously known and greatly enhancing production.

In one embodiment, the asphaltene precipitant additives have a vaporization temperature of at least the initial reservoir temperature in the reservoir. It is noted that vaporization temperature is a phase transition from liquid phase to gas phase that varies with pressure. One of ordinary skill in the art would be able to predict the vaporization temperature using for instance the well-known Antoine equation which describes the relation between vapor pressure and temperature for compounds.

In addition, the one or more hydrocarbon solvents and one or more asphaltene precipitant additives are injected into the well for a sufficient period to produce the upgraded hydrocarbon, e.g., a period of at least about 1 hour, or at least about 1 day, e.g., from 1 hour up to 24 hours.

In one embodiment, referring to FIG. 1, a volume of hydrocarbon solvent(s) 10, optionally heated, and one or more asphaltene precipitant additives 12 are provided and injected into an injection well from a manifold or tree 13 in a producing reservoir 14 in any order at a desired ratio of solvent to heavy hydrocarbon. In one embodiment, the asphaltene precipitant additives 12 and the one or more hydrocarbon solvents 10 are injected at a ratio by volume of the solvent to the heavy hydrocarbon of from 0.1:1 to about 20:1. The ratio of the solvent to oil is expressed herein as volume/volume (v/v). In one embodiment, the one or more hydrocarbon solvents are injected at a ratio by volume of the solvent to the heavy hydrocarbon of about 0.5:1 to about 4:1.

The one or more asphaltene precipitant additives are injected into the heavy hydrocarbon at a ratio by weight of the one or more asphaltene precipitant additives to the one or more hydrocarbon solvents of at least from about 10 ppm:1 to about 100,000 ppm:1, even from about 10 ppm:1 to about 10,000 ppm:1. For the purposes of this application, the ratio of precipitant additive/solvent is measured as weight/weight, i.e. milligrams/kilograms in the laboratory. In the field, the ratio may be expressed as kilogram/1000 Ton (1000 kilograms). In one embodiment, the one or more asphaltene precipitant additives are injected into the heavy hydrocarbon at a weight ratio of the one or more asphaltene precipitant additives to the one or more light solvents of from about 50 ppm:1 to about 1000 ppm:1.

In one embodiment, the downhole injection can be carried out using conventional pumps used in petroleum field applications. This process can be accomplished in huff-and-puff (discontinuous) or in a continuous fashion. Advantageously, the injection into the injection well of the one or more hydrocarbon solvents and/or and one or more asphaltene precipitant additives is at a pressure sufficiently high to create fractures and/or dilate the reservoir, thereby increasing penetration into the reservoir at vapor conditions, yet sufficiently low to prevent breaching a caprock over the reservoir.

As shown, the solvent and the asphaltene precipitant additive are injected into the reservoir 14 to induce in situ asphaltene precipitation at reservoir conditions to increase oil production rates. In some embodiments, the upgraded oil has a minimum of 16 API vs. an original of about 8 API, and two- to three-fold reduction of viscosity making it transportable using pipelines (e.g., a viscosity of about 350 cSt at 35° C.) without the need for expensive surface upgrader facilities. The upgraded oil has a lower content of contaminants (e.g., sulfur, vanadium and nickel) and a higher content of distillable material in comparison with the original crude oil.

A blend containing an upgraded hydrocarbon, the one or more hydrocarbon solvents and a remaining portion of the one or more asphaltene precipitant additives, and precipitated asphaltenes, are formed in the reservoir. The precipitated asphaltenes are present in the reservoir in a higher amount, e.g. at least 5 wt. % higher, than prior to the injection of the one or more asphaltene precipitant additives. Following a desired injection time, the production well is then operated at production conditions, i.e., reservoir conditions, to produce a volume 16 of the blend containing the upgraded hydrocarbon oil, hydrocarbon solvent and portion of the asphaltene precipitant additives remaining after the formation of the precipitated asphaltenes. The blend can further contain produced water and gas. The produced volume 16, i.e. the blend, is separated in a topsides facility, e.g., a separator, to provide a final produced upgraded hydrocarbon oil product 18 having the desired improved characteristics and a recovered hydrocarbon solvent portion 20 which can be recycled for use in the initial injection step as desired. The produced water can also be separated as stream 17. The remaining portion of the asphaltene precipitant additives can also be removed with the hydrocarbon solvent. The final produced upgraded hydrocarbon product 18 can contain less than 100 ppm of the one or more asphaltene precipitant additives. This advantageously avoids the need for additional wells, be they horizontal wells or otherwise, and serves to minimize the amount of solvent or other additive injection, and provides for ease in recovery and recycling of same. Thus, the process of the present invention is advantageous in terms of cost of equipment, raw materials and labor. Furthermore, the process of the present invention advantageously provides for upgrading and production of heavy hydrocarbons which cannot otherwise be economically produced. The upgraded hydrocarbon oil product 18 is produced without the precipitated asphaltenes such that the precipitated asphaltenes remain in the reservoir 14.

The one or more hydrocarbon solvents for use in the process of the present invention contain one or more $C_1$-$C_8$ hydrocarbon solvents. Examples of such solvents include methane, ethane, propane, butane, pentane or any other paraffin, cycloparaffin or mixture of thereof. In addition, the hydrocarbon solvents can also contain $C_1$-$C_{10}$ fractions. Additionally, cycloparaffins such as cyclo-pentane, cyclohexane and mixtures thereof can also be used in embodiments of the present invention. The solvent can induce asphaltene precipitation at subsurface conditions, i.e., pressure of greater than 100 psi and temperatures greater than 50° C. Naphtha or any other high paraffin or cycloparaffin content refinery stream is also a suitable solvent. The volume and type of solvent injected depends on the reservoir condition, asphaltene content and amount of oil to be produced.

The wells positioned in the reservoir 14 are well known and can include, by way of example, vertical, horizontal, slanted wells or multilateral wells having multiple lateral wells connected to a main wellbore.

Figure 2:
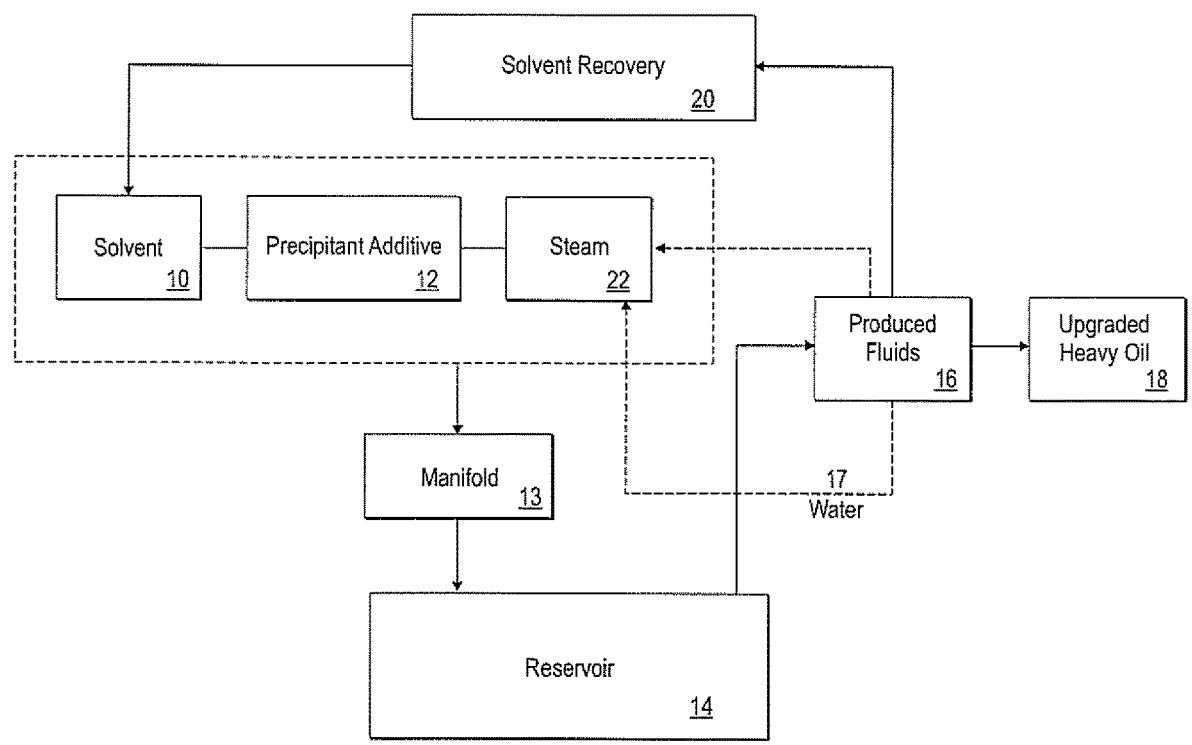
FIG. 2 is a schematic diagram for the process for in situ upgrading of a heavy hydrocarbon via solvent deasphalting in the presence of steam using asphaltene precipitant additives that travel in the gas phase.

In one embodiment, as shown in FIG. 2, similar to the process shown in FIG. 1, the process for in situ upgrading of a heavy hydrocarbon further involves injecting steam 22 with the hydrocarbon solvent(s) 10 and the asphaltene precipitant additive(s) 12 from a manifold or tree 13 into a horizontal well in a SAGD configuration in a reservoir 14 containing the heavy hydrocarbon in any order under reservoir conditions to provide an upgraded hydrocarbon in the reservoir. Produced water 17 produced from the reservoir can optionally provide the water to form the steam 22. Likewise, produced gas 19 produced from the reservoir can optionally be used as fuel to generate the steam 22.

In one embodiment, the heavy hydrocarbon has an initial API gravity of less than or equal to about 20, an n-heptane asphaltene content as measured by the ASTM D-6560 of at least about 1 wt. %, and a viscosity at 35° C. greater than about 350 centistokes (cSt). In one embodiment, oil with a lower viscosity is produced. In one embodiment, the upgraded oil 18 has an improved API gravity greater than the initial API gravity and a reduction in asphaltene content. In one embodiment, steam 22 is injected at a temperature of from the initial reservoir temperature to 300° C. into the injection well with the one or more hydrocarbon solvents 10 and the one or more asphaltene precipitant additives 12 in any order. The one or more asphaltene precipitant additives will then condense with the steam in the reservoir 14.

In one embodiment, the hydrocarbon solvent(s) 10 are first injected into the heavy hydrocarbon and then the one or more asphaltene precipitant additives 12 are injected into the mixture of hydrocarbon solvent(s) and heavy hydrocarbon. In another embodiment, the one or more asphaltene precipitant additives 12 are first injected into the heavy hydrocarbon and then the one or more hydrocarbon solvents 10 are injected into the mixture of the one or more asphaltene precipitant additives and heavy hydrocarbon. In yet another embodiment, the one or more asphaltene precipitant additives 12 and one or more hydrocarbon solvents 10 are injected simultaneously into the heavy hydrocarbon. In yet another embodiment, the one or more asphaltene precipitant additives 12 are added either to the hydrocarbon solvent 10 first or directly to the steam/solvent mixture.

Figure 3:
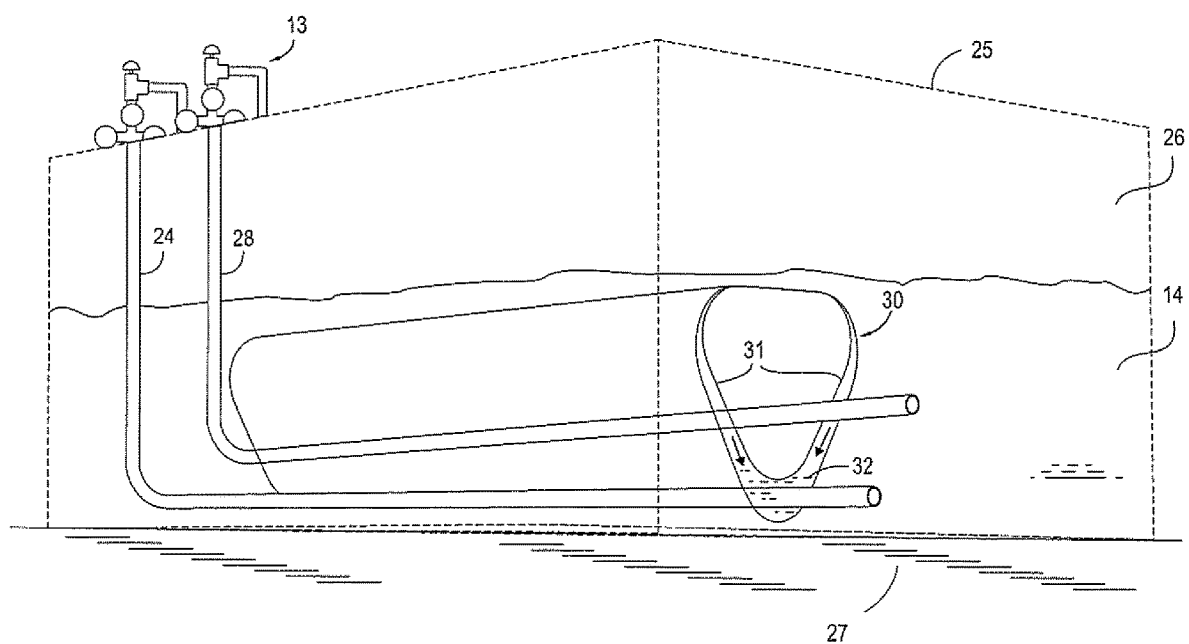
FIG. 3 is a diagram for the process for in situ upgrading of a heavy hydrocarbon via solvent deasphalting using a SAGD and asphaltene precipitant additives that travel in the gas phase.

In a SAGD well configuration, there is a top horizontal injection well (also referred to as an injector) and a parallel bottom horizontal production well (also referred to as a producer). In a standard SAGD configuration, referring to FIG. 3, the horizontal production well 24 is drilled into the oil reservoir 14 penetrating the surface of the earth 25 and overburden materials 26. The reservoir 14 is bounded on the top and bottom by one surface, the bottom of the overburden 26, and by another surface, the top of the understratum 27. Above the oil reservoir 14 is the overburden 26, which is of any one or more of shale, rock, sand layers, and aquifers. The horizontal injection well 28, typically aligned vertically between 5 and 10 meters above the production well 24 is also drilled into the reservoir 14. In one embodiment, steam, solvent and the asphaltene precipitant additive(s) are injected into the reservoir 14 through the manifold or tree 13 into the injection well 28 and flow into the steam depletion chamber 30. In substantially vapor form, steam, solvent and the asphaltene precipitant additive(s) flow to the edges 31 of the chamber 30, condense at approximately the same location, and deliver their latent heat to the tar sand within the reservoir. When the solvent and the asphaltene precipitant additive(s) contact the heavy oil, the asphaltene precipitation takes place. As reservoir fluids 32, also referred to herein as the blend, including upgraded hydrocarbons, hydrocarbon solvent, any remaining portion of asphaltene precipitant additive and produced water, are produced to the surface with the production well 24, the steam chamber 30 expands further into the oil reservoir 14. The injected steam acts to deliver both heat and pressure to the reservoir 14. After the oil in the reservoir is heated, its viscosity falls, it becomes more mobile, and it flows under gravity to the production well 24, as in conventional SAGD. The asphaltene precipitant additive(s) advantageously allow the combined steam and solvent to travel at least 10 meters, even at least 30 meters, and even at least 70 meters from the injection well 28, thus enhancing production. As in previously discussed embodiments, at a topsides facility (not shown), the upgraded hydrocarbons, hydrocarbon solvent, any remaining portion of asphaltene precipitant additive and produced water are separated to form the final upgraded hydrocarbon product. As in previously discussed embodiments, precipitated asphaltenes are formed in the reservoir 14 and remain in the reservoir, i.e., they are not produced to the surface with the produced fluids.

Figure 4:
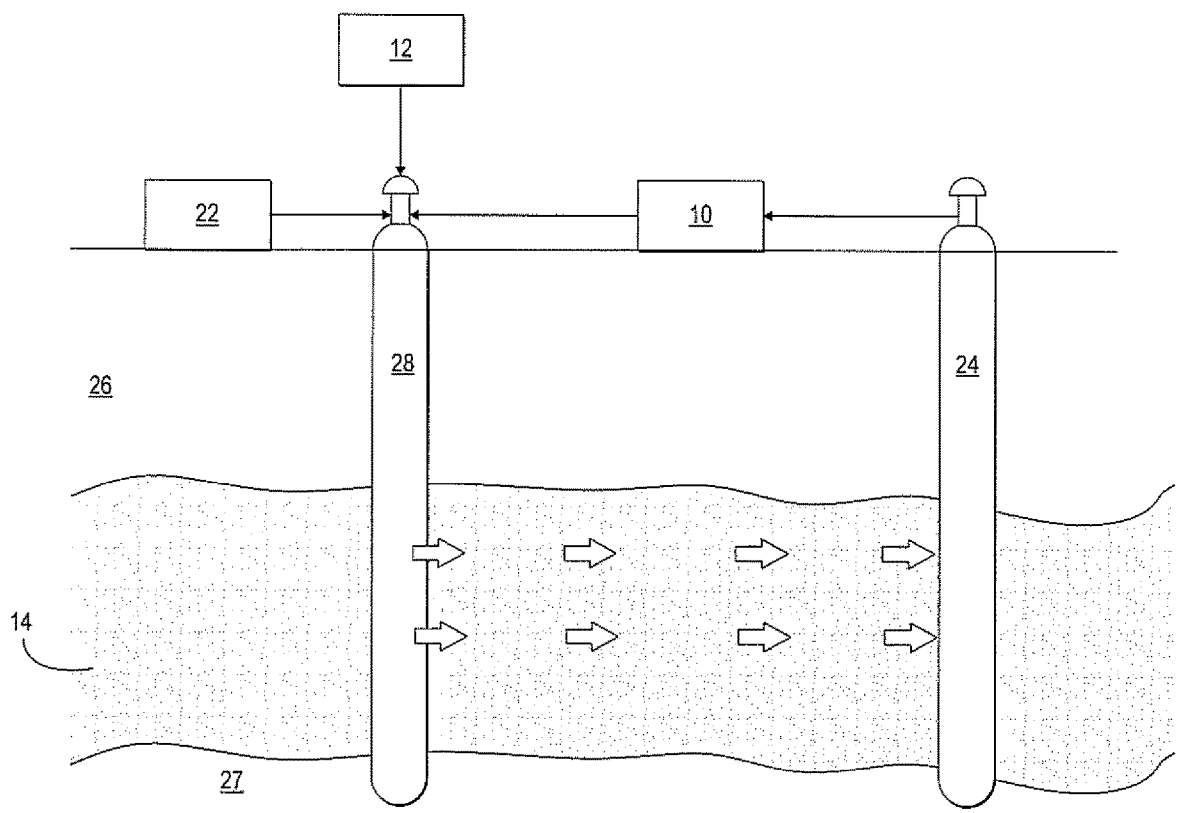
FIG. 4 is a diagram for the process for in situ upgrading of a heavy hydrocarbon via solvent deasphalting using a steam flooding and asphaltene precipitant additives that travel in the gas phase.

In one embodiment, as shown in FIG. 4, the process for in situ upgrading of a heavy hydrocarbon utilizes spaced vertical wells. As shown, steam, solvent and the asphaltene precipitant additive(s) are injected into the reservoir 14 through the injection well 28 and flow horizontally toward the production well 24. Again, the reservoir 14 is bounded on the top and bottom by one surface, the bottom of the overburden 26, and by another surface, the top of the understratum 27. The vertical injection well 28 is typically spaced at least 10 meters from the production well 24. Using the asphaltene precipitant additive(s) 12 as disclosed herein, the steam, solvent and asphaltene precipitant additive(s) travel at least 10 meters in the vapor phase within the reservoir 14.

In one embodiment, once the final upgraded hydrocarbon product has been produced, the upgraded hydrocarbon can first be transported by way of, for example, a pipeline, and then further transported by another transportation carrier to a desired location such as a refinery for further processing. For example, the upgraded hydrocarbon can be transported through a pipeline to a ship terminal where the upgraded hydrocarbon is then further transported on a ship to a desired refinery.

In one embodiment, a method for selecting an asphaltene precipitant additive for use in a process for in situ upgrading of a heavy hydrocarbon in a reservoir having an injection well and a production well is provided. The method includes first determining reservoir conditions for the reservoir including an initial reservoir temperature, a reservoir pressure and an operating temperature. The operating temperature may be the initial reservoir temperature or a steam temperature up to 300° C. Next, a plurality of candidate additives is identified for use as the asphaltene precipitant additive. The plurality of candidate additives is a plurality of compounds having C—H, C—C or C—O bonds that thermally crack at the operating temperature to generate free radicals that are in the vapor phase at the operating temperature. A weight percent asphaltenes precipitated from the heavy hydrocarbon and a hydrocarbon solvent solution with no asphaltene precipitant additive is determined. A weight percent asphaltenes precipitated from the heavy hydrocarbon and the hydrocarbon solvent solution with each of the plurality of candidate additives as identified is determined. A percent increase of asphaltenes precipitated for each of the plurality of candidate additives is calculated using the following equation:

$$\text{Percent (\%) increase of asphaltenes precipitated} = [(\text{weight \% asphaltenes precipitated with candidate additive} - \text{weight \% asphaltenes precipitated with no additive})/\text{weight \% asphaltenes precipitated with no additive}] \times 100.$$

Finally, the candidate additive giving the highest calculated percent increase of asphaltenes precipitated among the plurality of candidate additives is selected for use as the asphaltene precipitant additive. In one embodiment, each of the plurality of compounds has a condensation temperature, calculated at a partial pressure to steam near a vapor-oil interface, i.e., 31 in FIG. 3, in the reservoir, of at least the reservoir temperature. This embodiment provides the ability to maintain asphaltene precipitant activity at process operating temperatures and the ability to condense at or near the gas-oil interface. The concentration of solvent and additive should be selected to have a partial pressure in the steam allowing it to condense at or near the steam-oil interface. Emulsifiers or other surface-active chemicals can be further injected to allow the solvent and precipitant to be carried to the gas-oil interface and deposited at the desired solvent-precipitant ratio.

EXAMPLES

The following non-limiting examples are illustrative of embodiments of the present invention.

Example 1

0.1 gram of Venezuelan Crude Oil-1 (7.7° API) was dissolved in 10 mL of toluene. This solution was analyzed for asphaltene content using the on-column filtration method reported in the literature according to Rogel et al., *Energy & Fuel*, 23, 4515-4521 (2009) at 195° C. Next, 500 ppm of different potential asphaltene precipitant additives was added and the samples were analyzed for asphaltene content (wt. %) using the same methodology as before at 195° C. The results are shown below in Table 1.

TABLE 1

| Additive | wt. % Asphaltenes | Vaporization Point (° C.) at 1 atm |
|---|---|---|
| Comparison (No additives) | 14% | — |
| Hydrogen peroxide (H₂O₂) | 20% | 114 |
| Diethyl ether | 18% | 35 |
| Di-isopropyl ether | 22% | 69 |
| Isopropanol | 18% | 83 |
| 2-Phenyl-2-Propanol | 16% | 202 |
| Ally Alcohol | 19% | 97 |
| Benzyl Alcohol | 15% | 208 |
| Bibenzyl | 22% | 255 |
| Methylnaphthalene | 19% | 240 |
| Tetralin | 19% | 207 |
| Cumene | 15% | 152 |

As can be seen from Table 1, the use of 500 ppm of asphaltene precipitant additives increases the asphaltene content as determined by the on-column filtration technique. The asphaltene precipitant additives have vaporization points lower than 300° C. Thus, during downhole injection, these additives can travel with steam in the vapor phase at up to 300° C. to penetrate deeper, i.e., greater than 10 m, into the reservoir.

The percent increase of the asphaltenes can be calculated using the following equation:

% increase asphaltenes precipitated=(wt. % asphaltenes precipitated with additive−wt. % asphaltenes precipitated with no additive)/wt. % asphaltenes precipitated with no additive]×100

Figure 5:
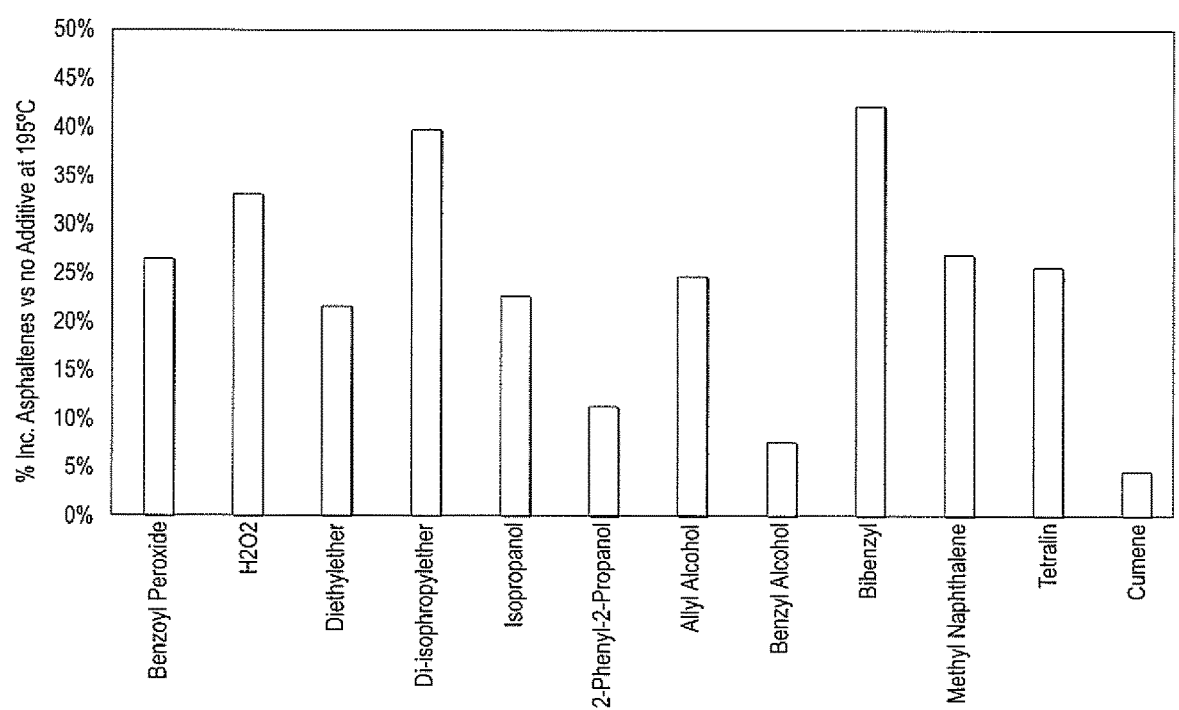
FIG. 5 shows the percent of increment of asphaltene content by using asphaltene precipitant additives at a dosage of 500 ppm at 195° C.

As can be seen in the results shown in FIG. 5, the addition of asphaltene precipitant additives increased the amount of asphaltenes present to varying degrees. In descending order, biphenyl, di-isopropylether, hydrogen peroxide, benzoyl peroxide, methyl naphthalene, tetralin, allyl alcohol, isopropanol and diethylether are shown to be effective asphaltene precipitants with percent increases of the asphaltenes in the 30-59% wt./wt. range. As described herein, the asphaltene precipitant additives can be added downhole to increase the amount of asphaltenes precipitated and to reduce the amount of solvent needed for the production and transportation of heavy hydrocarbons.

Example 2

Figure 6:
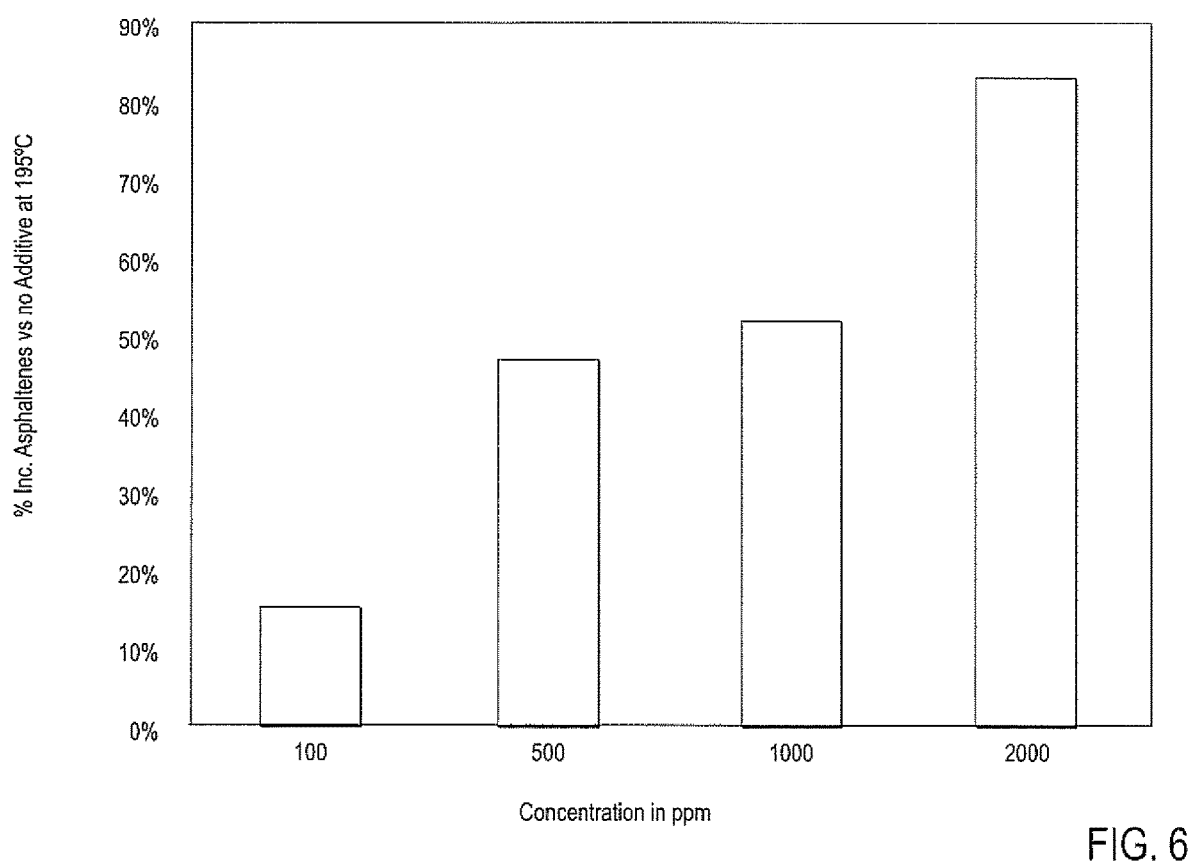
FIG. 6 shows the percent of increment of asphaltene contents by using di-isopropylether as an asphaltene precipitant additive at a dosage of 500 ppm at 195° C.

Following the same methodology as Example 1, 100 ppm, 500 ppm, 1000 ppm, and 2000 ppm of di-isopropylether were used as asphaltene precipitant additives in the Venezuelan Crude. As can be seen in the results shown in FIG. 6, up to 83% increase of asphaltene content was obtained.

Without wishing to be bound by theory, it is believed that, at high temperature, the asphaltene precipitant additives evaluated generate free radical species. As an example, the thermal-initiated homolytic cleavage reaction of one of the C—O bonds of the di-isopropyl ether is shown below:

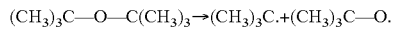

(CH₃)₃C—O—C(CH₃)₃→(CH₃)₃C.+(CH₃)₃C—O.

This reaction leads to the generation of isopropyl ((CH₃)₃C.) and isopropoxy ((CH₃)₃C—O.) radicals. In turn, these free radical species react with the asphaltenes and maltenes present in the heavy crude oil to yield higher asphaltenes content than found in the original crude oil.

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A process for in situ upgrading of a heavy hydrocarbon in a reservoir having an injection well and a production well, or a well that is alternately operated as an injection well and a production well, the process comprising:
  a. injecting into the injection well in the reservoir one or more hydrocarbon solvents and one or more asphaltene precipitant additives comprising compounds having C—H, C—C and/or C—O bonds that thermally crack to generate free radicals in a vapor phase after injection into the reservoir at an injection site in any order at a ratio by volume of solvent injected to heavy hydrocarbon produced of from 0.1:1 to about 20:1 under reservoir conditions so as to form in the reservoir a blend containing an upgraded hydrocarbon, the one or more hydrocarbon solvents and a remaining portion of the one or more asphaltene precipitant additives, and precipitated asphaltenes such that the precipitated asphaltenes are present in the reservoir in a higher amount than prior to the injection of the one or more asphaltene precipitant additives;
  wherein the upgraded hydrocarbon has an API gravity greater than an initial API gravity of the heavy hydrocarbon, an asphaltene content lower than an initial asphaltene content of the heavy hydrocarbon, and a viscosity lower than an initial viscosity of the heavy hydrocarbon; and
  wherein more than 50 wt. % of the generated free radicals are in the vapor phase and wherein the one or more asphaltene precipitant additives comprise:
    i. ethers selected from the group consisting of dimethylether, diethylether, di-n-propylether, di-isopropylether, dibutylether, di-n-butylether, diisobutylether, di-tert-butylether, methylethylether, methylpropylether, methylbutylether, methyl-tert-butylether, ethylpropylether, ethylbutylether, and propylbutylether;

ii. alcohols selected from the group consisting of n-propanol, isopropanol, 2-phenyl-2-propanol, allyl alcohol, butanol, isobutanol, tert-butanol, and benzyl alcohol;
iii. hydrocarbons selected from the group consisting of bibenzyl, naphthalene, methyl naphthalene, ethyl naphthalene, propyl naphthalene, tetralin, 1,2-dihydronaphthalene, and 1,4-dihydronaphthalene;
iv. or any combination thereof;
b. producing from the production well the blend without the precipitated asphaltenes such that the precipitated asphaltenes remain in the reservoir; and
c. separating the blend into the upgraded hydrocarbon, the one or more hydrocarbon solvents and the remaining portion of the one or more asphaltene precipitant additives.

2. The process of claim 1 wherein the reservoir conditions comprise an initial reservoir temperature of from about 5° C. to about 140° C. and a reservoir pressure of from about 250 psia to about 2500 psia, and the hydrocarbon solvents are injected into the injection well at temperatures equal to or greater than the initial reservoir temperature.

3. The process of claim 2 further comprising injecting steam at a temperature of from the initial reservoir temperature up to 300° C. into the injection well with the one or more hydrocarbon solvents and the one or more asphaltene precipitant additives in any order; wherein the one or more asphaltene precipitant additives condense with the steam in the reservoir.

4. The process of claim 1 wherein the one or more asphaltene precipitant additives are injected into the reservoir at a ratio by weight of the one or more asphaltene precipitant additives to the one or more hydrocarbon solvents of from about 10 ppm:1 to about 100,000 ppm:1.

5. The process of claim 1 wherein the initial API gravity of the heavy hydrocarbon is less than or equal to about 20, an initial n-heptane asphaltene content of the heavy hydrocarbon as measured by the ASTM D-6560 is at least about 1 wt. %, and the initial viscosity of the heavy hydrocarbon is greater than about 350 cSt at 35° C.

6. The process of claim 1 wherein the distance the free radicals travel from the injection site in the reservoir in the vapor phase after injection is at least 10 meters.

7. The process of claim 1 wherein the one or more asphaltene precipitant additives further comprises hydrogen peroxide.

8. The process of claim 1 wherein the one or more asphaltene precipitant additives comprises a compound selected from the group consisting of diethylether, di-isopropylether, isopropanol, allyl alcohol, bibenzyl, methyl naphthalene, tetralin, and combinations thereof.

9. The process of claim 1 wherein the one or more asphaltene precipitant additives comprises a mixture selected from the group consisting of mixtures of hydrogen peroxide and acetone, mixtures of hydrogen peroxide and isopropanol, mixtures of hydrogen peroxide and methyl-tert-butylether, mixtures of hydrogen peroxide and tert-butanol, and combinations thereof.

10. The process of claim 1 wherein the one or more hydrocarbon solvents are injected at a ratio by volume of the solvent injected to the heavy hydrocarbon produced of about 0.5:1 to about 4:1.

11. The process according to claim 1, wherein the one or more hydrocarbon solvents include a $C_1$-$C_{10}$ hydrocarbon solvent.

12. The process according to claim 1, wherein the precipitated asphaltenes are present in the reservoir in an amount at least 5 wt. % higher than prior to the injection of the one or more asphaltene precipitant additives.

13. The process of claim 1 wherein the injecting into the injection well one or more hydrocarbon solvents and the one or more asphaltene precipitant additives is at a pressure sufficiently high to create fractures and/or dilate the reservoir, thereby increasing penetration into the reservoir at vapor conditions, and sufficiently low to prevent breaching a caprock over the reservoir.

14. A method for selecting an asphaltene precipitant additive for use in a process for in situ upgrading of a heavy hydrocarbon in a reservoir having an injection well and a production well, or a well that is alternately operated as an injection well and a production well, the method comprising:
a. determining reservoir conditions for the reservoir including an initial reservoir temperature, a reservoir pressure and an operating temperature;
b. identifying as a plurality of candidate additives for use as the asphaltene precipitant additive a plurality of compounds having C—H, C—C and/or C—O bonds that thermally crack at the operating temperature to generate free radicals in a vapor phase at the operating temperature; wherein more than 50 wt. % of the generated free radicals are in the vapor phase at the operating temperature;
c. determining a weight percent asphaltenes precipitated from the heavy hydrocarbon and a hydrocarbon solvent solution with no asphaltene precipitant additive;
d. determining a weight percent asphaltenes precipitated from the heavy hydrocarbon and the hydrocarbon solvent solution with each of the plurality of candidate additives as identified in step (b);
e. calculating a percent increase of asphaltenes precipitated for each of the plurality of candidate additives using the following equation:

percent increase of asphaltenes precipitated=[(weight percent asphaltenes precipitated with candidate additive–weight percent asphaltenes precipitated with no additive)/weight percent asphaltenes precipitated with no additive]×100;

f. selecting for use as the asphaltene precipitant additive the candidate additive giving the highest percent increase of asphaltenes precipitated as calculated in step (e) among the plurality of candidate additives; and
G. injecting the candidate additive selected in step (f) into the injection well in the reservoir.

15. The method of claim 14 wherein the operating temperature is the initial reservoir temperature.

16. The method of claim 14 wherein the operating temperature is a steam temperature up to 300° C.

17. The method of claim 14 wherein each of the plurality of compounds has a condensation temperature, calculated at a partial pressure to steam near a vapor-oil interface in the reservoir, of at least the reservoir temperature.

18. A process for in situ upgrading of a heavy hydrocarbon in a reservoir, the process comprising:
injecting into an injection well in the reservoir one or more hydrocarbon solvents and one or more asphaltene precipitant additives comprising compounds having C—H, C—C and/or C—O bonds that thermally crack to generate free radicals in a vapor phase after injection into the reservoir at an injection site in any order at a ratio by volume of solvent injected to heavy hydrocarbon produced of from 0.1:1 to about 20:1 under reservoir conditions so as to form in the reservoir a blend containing an upgraded hydrocarbon; wherein more than 50 wt. % of the generated free radicals are in the vapor phase; and wherein the one or more asphaltene precipitant additives comprise:

i. ethers selected from the group consisting of dimethylether, diethylether, di-n-propylether, di-isopropylether, dibutylether, di-n-butylether, diisobutylether, di-tert-butylether, methylethylether, methylpropylether, methylbutylether, methyl-tert-butylether, ethylpropylether, ethylbutylether, and propylbutylether;

ii. alcohols selected from the group consisting of n-propanol, isopropanol, 2-phenyl-2-propanol, allyl alcohol, butanol, isobutanol, tert-butanol, and benzyl alcohol;

iii. hydrocarbons selected from the group consisting of bibenzyl, naphthalene, methyl naphthalene, ethyl naphthalene, propyl naphthalene, tetralin, 1,2-dihydronaphthalene, and 1,4-dihydronaphthalene;

iv. or any combination thereof.

19. The process of claim 18 further comprising injecting steam at a temperature of from an initial reservoir temperature up to 300° C. into the injection well with the one or more hydrocarbon solvents and the one or more asphaltene precipitant additives in any order; wherein the one or more asphaltene precipitant additives condense with the steam in the reservoir.

20. The process of claim 18 wherein the one or more asphaltene precipitant additives are injected into the reservoir at a ratio by weight of the one or more asphaltene precipitant additives to the one or more hydrocarbon solvents of from about 10 ppm:1 to about 100,000 ppm:1.

21. The process of claim 18 wherein the one or more asphaltene precipitant additives further comprises hydrogen peroxide.

* * * * *